United States Patent [19]

Cartwright

[11] 3,725,594

[45] Apr. 3, 1973

[54] TELEPHONE TRANSFER CIRCUIT ACTUATED BY CALLING SIGNAL

[75] Inventor: Delmar G. Cartwright, Pte. Claire, Quebec, Canada

[73] Assignee: Bell Canada, Montreal, Quebec, Canada

[22] Filed: Mar. 29, 1971

[21] Appl. No.: 128,690

[52] U.S. Cl.........179/18 AD, 179/18 GB, 179/18 HB

[51] Int. Cl...............................................H04m 3/04

[58] Field of Search........179/18 AD, 99, 84 R, 84 A, 179/37, 1 H, 16 EC, 18 F, 18 FA, 18 G, 18 GA, 18 GB, 18 HB

[56] References Cited

UNITED STATES PATENTS

| | | | |
|---|---|---|---|
| 3,014,097 | 12/1961 | Apt | 179/18 AD |
| 2,811,586 | 10/1957 | Galbreath | 179/84 A |
| 2,883,457 | 4/1959 | Carter et al. | 179/18 AD |
| 3,259,697 | 7/1966 | Brumfield | 179/16 EC |
| 3,286,038 | 11/1966 | Field et al. | 179/18 AD |

*Primary Examiner*—Kathleen H. Claffy
*Assistant Examiner*—Randall P. Myers
*Attorney*—Rogers, Bereskin & Parr

[57] ABSTRACT

In an intercom telephone system, when a digit is dialled, a selector control circuit causes a selector to step to a position corresponding to the digit dialled, and ringing is then applied through the selector contacts to the called station. When more than ten stations are needed, one selector contact is connected through a rectifying circuit to a transfer relay. When the digit for such contact is dialled, the ringing voltage applied through such contact is rectified and operates the transfer relay. The transfer relay locks operated, shifts the ringing to the input of another selector level the contacts of which are connected to stations having two digit codes, and causes the selector to return to home position for receipt of the second digit.

6 Claims, 4 Drawing Figures

INVENTOR.
DELMAR G. CARTWRIGHT
BY Rogers, Bereskin & Parr

INVENTOR.
DELMAR G. CARTWRIGHT
BY Rogers, Bereskin & Parr

TELEPHONE TRANSFER CIRCUIT ACTUATED BY CALLING SIGNAL

This invention relates to a simple line transfer circuit suitable for use with an intercom telephone system.

In conventional intercom telephone systems, there is a source of ringing voltage, and a selector switch to direct the ringing voltage to the particular intercom station dialled. The selector switch normally has ten outputs, so that a simple system can accommodate only ten stations, the telephone number for each station being a single digit.

When the number of stations exceeds ten, then it is common to provide transfer circuits, one for each additional group of nine codes. Codes used for the transfer circuit are two digit codes, with the first digit of the two digit code being unavailable for use as a single digit code.

Transfer circuits are well known, but in the past special signalling has been required to activate such circuits. The present invention provides a simple transfer circuit which is activated by an ordinary signally voltage used in conventional intercom telephone systems and which does not require any special signal for activation. In a preferred embodiment of the invention this is achieved by connecting rectifying means to receive the ringing voltage when the first digit of a two digit code is dialled. The rectifying means rectifies the ringing voltage and applies it to a transfer switch (normally a relay) to operate the transfer switch, thereby activating the transfer circuit.

Further objects and advantages of the invention will appear from the following description, taken together with the accompanying drawings, in which.

Figures 1, 3, 4:
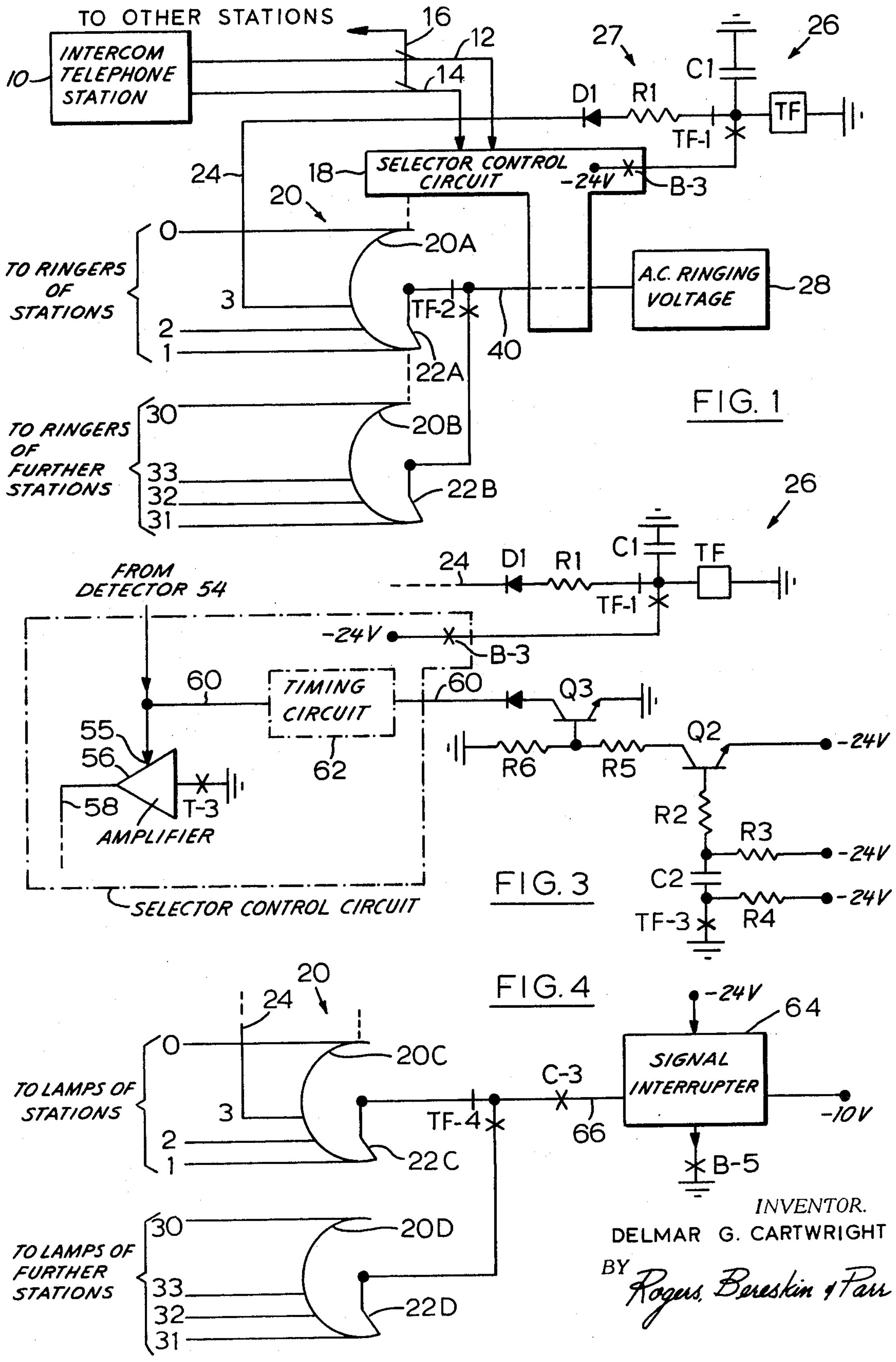
FIG. 1 shows a circuit of a line transfer circuit according to the invention, with a cooperating selector control circuit in block form.
FIG. 3 shows a modification of the FIG. 1 circuit.
FIG. 4 shows a further modification of the FIG. 1 circuit.

Reference is first made to FIG. 1, which shows a typical intercom station 10 connected to tip and ring lead 12, 14. Other intercom stations are also connected to the tip and ring leads 12, 14 as indicated by branch leads 16.

The tip and ring leads 12, 14 are connected to a selector control circuit 18. The selector control circuit 18 controls the stepping of a selector switch 20 having two levels of contacts 20A, 20B. Each level of contacts has the usual 10 output terminals. The selector switch also includes ganged wipers 22A, 22B for the contact leads.

It is assumed that the telephone numbers of the various stations are 1, 2, 3, 4, 5 - - - 0 and 31, 32 - - - 30. Accordingly, the output terminals of selector level 20A are numbered 1, 2, 3 - - - 0, and of these, terminals 1, 2, 4, 5 - - - 0 are connected to the ringers of respective stations whose telephone numbers are 1, 2, 4, 5 - - - 0. Output terminal 3 of selector level 20A is connected via lead 24 to a transfer circuit 26.

Similarly, the output terminals of selector level 20B are numbered 31, 32 - - - 30 and are connected to the ringers of respective stations whose telephone numbers are 31, 32 - - TF–30.

The transfer circuit 26 includes a rectifying circuit 27 consisting of a diode D1, resistor R1 and capacitor C1. The rectifying circuit is connected to lead 24 and is also connected to a transfer relay TF through contacts TF–1 of relay TF.

A source 28 of AC ringing voltage is provided to operate the ringer at the called station. The source 28 is connected via lead 40 through the selector control circuit and through contacts TF–2 of transfer relay TF to the wiper 22A of selector level 20A. The ringing voltage source 28 is also connected via lead 40 through a normally open contact of contacts TF–2 to the wiper 22B of selector level 20B.

The operation of the circuit shown in FIG. 1 is as follows. When a subscriber lifts his telephone, this contacts together leads 12, 14 to activate the selector control circuit 18. When he dials a single digit, the selector control circuit responds to the received dial pulses to step the selector switch 20 around until the wipers 22A, 22B rest on the terminals corresponding to the digit dialled. When dialling is completed and no further dial pulses are received, the selector control circuit recognizes this and applies a brief timed burst of AC ringing voltage over lead 40 and through the selected output terminal of selector level 20A to the ringer of the called single digit station. No ringing is applied to wiper 22B because of the released contacts TF–2. After the timed burst of ringing, the selector control circuit 18 steps the wipers 22A, 22B back to their home position again, in which the wipers are disconnected from all the output leads.

When the first digit "3" of a two digit code is dialled, the selector switch steps to a position in which wiper 22A rests on output terminal 3 as before, and a brief burst of ringing voltage is then applied over lead 40 as before. This burst of ringing voltage is conducted via lead 24 to the rectifying circuit 27, rectified, and applied to relay TF to operate this relay. Relay TF then locks operated through contacts TF–1 and B–3 to −24 volts. (Contact B–3 is part of a relay B, not shown in FIG. 1, in the selector control circuit which operates whenever a station in the system is off-hook.)

After the brief burst of ringing applied to terminal 3 has ended, the selector control circuit steps the wipers 22A, 22B back to their home position, and the circuit is ready to receive the second digit of the two digit code.

When the subscriber dials a second digit, the selector control circuit 18 steps the selector switch until its wipers rest on the output terminals corresponding to the digit dialled, as before. The selector control circuit then applies a brief burst of ringing voltage through operated contacts TF–2 and wiper 22B to the ringer of the called station (which, as indicated, has a two digit telephone number). The selector control circuit then causes the selector switch to return to its home position.

Figure 2:
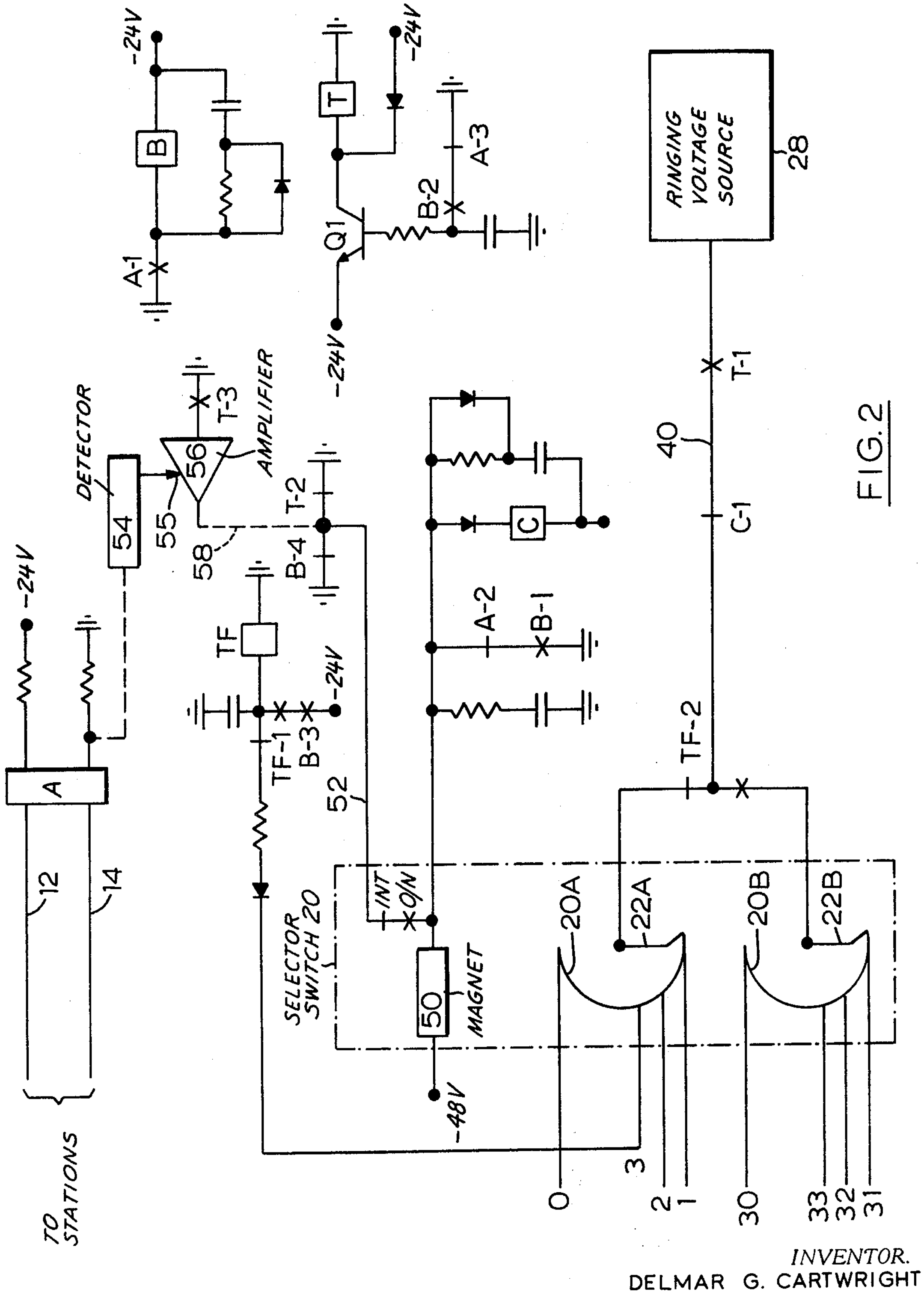
FIG. 2 shows an exemplary circuit for the selector control circuit of FIG. 1.

Reference is next made to FIG. 2, which shows a typical selector control circuit 18 and its connections in more detail, as well as showing some detail of the selector switch 20. The selector switch 20 is typically of the type manufactured by C.P. Clare (Canada) Limited under its model No. NSQ4131–L1 and includes a magnet 50, and a homing lead 52 which contains off-normal contacts O/N which are closed only when the selector switch is in an off normal position, i.e. away from its home position, and interrupter contacts INT which operate and open only when the selector magnet 50 is operated, i.e. energized. The selector switch operates by moving the wipers one step each time the magnet 50 is de-energized.

The selector control circuit 18 includes a line relay A, which is connected to the tip and ring leads 12, 14 as shown. The selector control circuit also includes slow release relays B and C, and a very slow release relay T, all connected as shown.

The circuit of FIG. 2 is best understood by a description of its operation, which is as follows. When the subscriber at station 10 lifts his hand set, connecting lead 12, 14 together, the resultant current in the tip and ring leads operates relay A. Contact A–1 then closes and operates relay B. Contact B–1 then prepares an operate path for relay C and for the magnet 50, contact B–2 prepares an operate path for relay T, and contact B–3 prepares the locking path for relay TF as previously described.

The calling customer then dials a digit. On the first dial break, relay A releases. Contact A–2 then closes to operate relay C and the magnet 50, and contact A–3 closes to operate transistor Q1 and hence relay T. Relay T is very slow release because of the capacitor connected to the base of transistor Q1, which keeps transistor Q1 on for 1½ to 3 seconds after the ground to its base is removed. Contact T–1 closes to connect the ringing supply voltage to the ringing lead 40, but contact C–1 opens to ensure that no ringing voltage is connected to the output terminals of the selector levels during stepping.

At the end of the first dial pulse, relay A re-operates, and contact A–2 opens to de-energize the magnet 50. Relays B, C and T remain operated during this inter-digital period since they are slow release. The magnet being released, advances the wipers 22A, 22B one step. As further dial pulses are received, the stepping continues, until at the end of dialling, the wipers 22A, 22B rest on output terminals corresponding to the number dialled.

At the end of dialling, relay A re-operates and shortly thereafter, relay C releases due to opening of contact A–2. Contact C–1 then closes to apply ringing voltage from source 28 through contacts T–1, ringing lead 40, released contacts TF–2,and through wiper 22A of selector level 20A to the selected output terminal and hence to the called intercom station. After a ringing period timed by relay T, relay T releases (due to opening of contact A–3) and contact T–1 removes the ringing from the called station. At the same time, contact T–2 closes to connect ground to homing lead 52 to the magnet 50. Since the magnet is released at this time, and since the selector switch is in an off normal position, the ground is conducted through contacts INT and O/N to the magnet 50 to energize the magnet. When the magnet is energized, contacts TNT open to release the magnet, causing the selector to advance one step and causing the magnet to be re-energized. In this manner, the selector switch steps around to its home position, at which time contacts O/N open to terminate the operation of the selector.

If the calling party hangs up while the selector is in an off normal position, then relay B releases due to release of relay A, and contacts B–4 close to apply ground to the homing lead 52 again to restore the selector switch to its home position.

If the first digit dialled was that of a two digit member, then as previously described, the brief burst of ringing voltage is applied to the transfer circuit to operate relay TF, which locks operated through contacts TF–1 and B–3.

Relay T then releases as before, causing the selector switch to return to its home position in readiness to receive another digit.

When the second digit is dialled, the selector operation is exactly the same as for the first digit, and when the selector has stepped to a position corresponding to the number dialled, the ringing voltage is applied through ringing lead 40 to the wiper 22B of the second selector level and hence to the ringer of the called station.

The selector control circuit shown in FIG. 2 is of a type which homes automatically, due to release of relay T, as soon as the ringing has been completed. Other types of selector control circuits may be employed in which the selector does not normally return to its home position until such time as the called party answers. Such an arrangement is shown in my corresponding application Ser. No. 128,691 filed concurrently herewith, and is also shown diagrammatically in FIG. 2 as including a detector 54 connected to detect the increased current which flows in leads 12, 14 when the called party answers. The detector 54 applies a voltage to input 55 of amplifier 56 for a predetermined period of time. Amplifier 56 responds by connecting ground via lead 58 to homing lead 52 for the duration of the detector voltage, causing the selector switch 20 to step to its home position. The period of time for which the amplifier applies a voltage to lead 52 is made long enough to ensure that the selector 20 will return to its home position. When the voltage produced by detector 54 terminates, the amplifier 56 ceases to apply ground to lead 52 so that the selector can respond to receipt of another digit. Contact T–3 disables amplifier 56 during dialling, to prevent the selector 20 from homing prematurely. Contact T–2 is not used with such an arrangement.

With the arrangement just described, in which the selector 20 does not normally home until the called party answers, a special signal is required from the transfer circuit to cause the selector to home so that a second digit may be dialled. In that case, as shown in FIG. 3, the transfer circuit 26 may include transistors Q2, Q3. The base of transistor Q2 is connected through resistor R2, capacitor C2, and contacts TF–3 of relay TF to ground, while each side of capacitor C2 is connected to −24 volts through resistors R3, R4 respectively. The emitter of transistor Q2 is connected to −24 volts while its collector is grounded through resistors R5, R6. The base of transistor Q3 is connected to the junction of resistors R5, R6; the emitter of transistor Q3 is grounded, and the collector of transistor Q3 is connected via lead 60 to the input 55 of amplifier 56.

When the first digit of a two digit code is dialled and transfer relay TF operates, contacts TF–3 close, applying a ground pulse to the base of transistor Q2 to turn on the latter. Transistor Q2 then turns on transistor Q3, which grounds lead 60, turning on amplifier 56 which grounds homing lead 52, causing the selector 20 to home. After a short time interval, as capacitor C2 charges, transistor Q2 turns off, turning off transistor Q1 and removing the ground from lead 60. Resistor R3 and capacitor C2 provide a long enough time constant to ensure return of the selector to its home position. If desired, a timing circuit 62, shown in chain dotted lines in FIG. 3, can be provided in lead 60 to lengthen the time during which amplifier 56 operates when the transfer relay TF operates.

The line transfer circuit shown may also be used in telephone systems of the type described in which some stations employ touch tone dialling, provided that the touch tone digit information is employed to cause the selector switch 20 to step to a position corresponding to the digit dialled. Such an arrangement is also shown in my above mentioned copending application.

If desired, additional levels may be added to the selector switch 20 to transmit a lamp flash voltage to the called party Such an arrangement is shown in FIG. 4. The FIG. 4 circuit includes a signal interrupter 64 which is operated by contact B–5 of relay B and provides −10 volts intermittently to a lamp flash lead 66. The lamp flash lead 66 is connected through contacts C–3 and TF–4 to the wipers 22C, 22D of two additional selector leads 20C, 20D. The output terminals of selector level 20C may be directed to the lamps of stations having single digit telephone numbers, while the output leads of selector level 20D may be directed to the lamps of stations having two digit telephone numbers.

If desired, and as shown in FIG. 4, the lamp flash voltage instead of the ringing voltage may be used to operate the line transfer circuit by connecting terminal 3 of selector level 20C to lead 24 to the transfer circuit. (Output terminal 3 of selector level 20A is then simply open circuited.) Since the lamp flash voltage is simply an interrupted DC voltage, diode D1 can be removed. However, the capacitor C1 and resistor R1 may remain to reduce the dip in voltage between flashes. This method of energizing relay TF can involve some delay, if the lamp flash voltage supply becomes connected to the transfer circuit at the period between flashes, but since the period between flashes is usually very small, the delay is usually tolerable.

Although the switching means described, for applying ringing and lamp flash voltages to stations, is a selector switch, the transfer circuit of the invention is also operable with other suitable switching means, such as relay trees. In all cases the signal used to operate the transfer circuit will be a pulsating type signal also used to signal a called station that a call has been made to it.

What I claim is

1. In a telephone system of the type including station switching means having at least first and second input terminals, a first set of output terminals associated with said first input terminal and a second set of output terminals associated with said second input terminal, the respective output terminals of each output terminal set being associated with respective dialled digits, at least some of said output terminals of said first set being connected to stations having single digit telephone numbers and at least some of said output terminals of said second set being connected to stations having two digit telephone numbers, a control circuit responsive to receipt of dial signal from a calling station for setting said switching means to a condition in which said input terminals are connected to the output terminals corresponding to the digit represented by the dial signal received, and a calling signal source for normally supplying a pulsating calling signal to said first input terminal for connection through an output terminal of said first output terminal set to a called single digit telephone number station to provide a call indication at such called station; an improved line transfer circuit comprising:

a. a transfer switch, b. means connected between said transfer switch and a selected output terminal of said first output terminal set and responsive to receipt of said calling signal at said selected output terminal to operate said transfer switch, c. means for locking said transfer switch operated upon operation of said transfer switch, d. said transfer switch including means for coupling said calling signal source to said second input terminal, said system further including means for resetting said switching means to a home condition in which said input terminals are disconnected from said output terminals so that when a dial signal representing a second digit is then received from the calling station, causing said control circuit means to set said switching means to a condition in which said input terminals are connected to the output terminals corresponding to said second digit, said pulsating ringing signal will be applied through the output terminal of said second set associated with said second digit, for transmission to a station having a two digit telephone number.

2. A system according to claim 1 wherein said calling signal is an alternating ringing signal, and said means (b) includes rectifying means for rectifying said ringing signal.

3. A system according to claim 1 wherein said calling signal is an intermittent lamp flash signal.

4. A system according to claim 2 wherein said transfer switch is a relay.

5. A system according to claim 4 wherein said station switching means is a selector switch, said control circuit including input means responsive to receipt of a homing signal for returning said selector switch to its home condition, and said transfer circuit includes homing signal source means responsive to operation of said transfer switch for supplying a homing signal to said input means of control circuit to cause said selector switch to return to its home position preparatory to receipt by said control circuit of a dial signal representing a second digit.

6. A system according to claim 5 wherein said homing signal source means comprises a first transistor biased to a normally off condition, means including a contact of said transfer relay connected to the base of said first transistor for operating said first transistor for a predetermined interval upon operation of said transfer relay, a second transistor, means connecting said first transistor to said second transistor for operation of said first transistor to operate said second transistor, and means connected to said second transistor to provide said homing signal during operation of said second transistor.

* * * * *